United States Patent [19]

Curwen et al.

[11] Patent Number: 4,814,650

[45] Date of Patent: Mar. 21, 1989

[54] FLAT PLUNGER LINEAR ELECTRODYNAMIC MACHINE

[75] Inventors: Peter W. Curwen, Ballston Spa; Ralph Hurst, Clifton Park, both of N.Y.

[73] Assignee: Mechanical Technology Incorporated, Latham, N.Y.

[21] Appl. No.: 24,242

[22] Filed: Mar. 10, 1987

[51] Int. Cl.$^4$ .................. F04B 25/02; H02K 7/00; H02K 33/00
[52] U.S. Cl. .......................... 310/22; 310/91; 417/418
[58] Field of Search ............... 310/15, 24, 34, 30, 310/16, 35, 23, 22, 91; 417/417, 418, 214

[56] References Cited

U.S. PATENT DOCUMENTS

| | | | |
|---|---|---|---|
| 3,277,394 | 10/1966 | Holt | 310/16 X |
| 3,312,842 | 4/1967 | Heuchling et al. | 310/30 X |
| 4,353,220 | 10/1982 | Curwen et al. | 417/214 |
| 4,395,649 | 7/1983 | Thome et al. | 310/24 X |
| 4,613,285 | 9/1986 | Sato et al. | 417/418 |

Primary Examiner—Patrick R. Salce
Assistant Examiner—D. L. Rebsch
Attorney, Agent, or Firm—Joseph V. Claeys; Joseph C. Sullivan

[57] ABSTRACT

An electrodynamic motor having a flat plunger core arrangement formed out of alternating layers of magnetic and insulating strips clamped together and maintained on respective bearing sleeves which reciprocate on guide members with the gap between stator members.

20 Claims, 7 Drawing Sheets

FLAT PLUNGER LINEAR ELECTRODYNAMIC MACHINE

TECHNICAL FIELD

The present invention relates to electrodynamic machines. Although the machine may be either a motor or a generator, it will be particularly described in connection with an electrodynamic linear motor for use in reciprocating machines such as compressors, pumps and the like.

BACKGROUND ART

There exists a wide variety of devices which utilize electrodynamic linear motors. When utilized with a reciprocating compressor or pump, for example, such an electrodynamic motor provides a driving force to a piston which provides the compression action on a working fluid, which may be a gas or a liquid.

The motor may have an armature with a coil wound about a support and positioned within a flux field provided by a permanent magnet stator means. Alternatively, the motor may have a plunger means which is positioned within the flux field. A compression piston is usually coupled to the armature and the armature held in a rest position by way of one or more main or resonance springs. When the motor is energized, a magnetic force is generated to drive the piston. The resonance spring causes the piston to oscillate back and forth to provide compression of the fluid. Arrangements which operate in a manner such as this, or similar thereto, can be found in U.S. Pat. Nos. 3,814,550 to Adams for "Motor Arrangement and Lubrication System for Oscillatory Compressor," issued June 4, 1974, 3,781,140 to Gladden for a "Synchronous Reciprocating Electrodynamic Compressor System," issued Dec. 24, 1973 and 3,325,085 to Gaus for a "Compressor," issued June 13, 1967, all of which involve a moving coil linear motor with permanent magnet excited stator field. Other compressor arrangements employing plunger-type electrodynamic motors can be found in U.S. Pat. Nos. 3,937,600 to White for a "Controlled Electrodynamic Linear Compressor" and 4,353,220 to Curwen for a "Resonant Piston Compressor Having Improved Stroke Control for Load-Following Electric Heat Pumps and the Like."

A continuing problem associated with known moving plunger electrodynamic resonant reciprocating compressors involves the total mass of the reciprocating assembly which comprises the compressor piston means and the motor plunger. Resonant operation of such compressors at the local A-C power frequency requires an appropriate amount of spring stiffness acting on the reciprocating assembly. It can be shown that the total required spring stiffness is almost directly proportional to the total mass of the reciprocating assembly, the major portion of which is determined by the mass of the motor plunger.

In one known prior art compressor system, for example, approximately 80 percent of the total mass of the reciprocating assembly was due to the motor plunger. Only 20 percent to 30 percent of the total stiffness could be supplied by the compression cylinders so that the remainder had to be supplied by gas-spring cylinders, as shown for example in U.S. Pat. Nos. 3,937,600 and 4,067,667.

While such gas-spring type resonant reciprocating compressors have been satisfactory, gas springs introduce undesirable losses and also contribute to increased manufacturing costs. It is desirable to avoid, if possible, the need for the use of gas springs by providing an electrodynamic motor having a much lighter plunger. Accordingly, there exists a need to further improve upon such electrodynamic motors for purposes of efficiency, weight and durability.

DISCLOSURE OF INVENTION

It is principal object of the invention to provide for an electrodynamic motor having a relatively lightweight but rugged, durable and efficient plunger.

It is another object of the invention to provide a new and improved electrodynamic linear reciprocating motor having a low plunger mass such that when incorporated in a resonant reciprocating machine, gas spring means can be minimized.

A further object is to provide for a plunger assembly for an electrodynamic motor that takes into account the temperature differentials of expansion and contraction and inherently compensates for them.

The present invention provides for an electrodynamic linear motor for use in a variety of reciprocating devices such as compressors, pumps, and the like. The plunger of the motor comprises a stack of flat magnetic members separated by electrically non-conductive and non-magnetic spacer members and held together in a rigid pack by suitable fastening means such as tie rods. In one arrangement the magnetic members are shaped as elongated flat laminated plates having at each end an enlarged opening to receive hollow bearing sleeves, thereby making up a basic plunger core assembly. A centered connecting rod is coupled to a compression piston at one end. A centering or resonance spring may be provided at the opposite end. However, depending on the motor application and the magnitude of the centering force provided by the motor, the centering spring may sometimes be eliminated. The hollow bearing sleeves are slidably mounted on respective bearing rods or shafts oppositely positioned and maintained by supporting bars. The motor is also provided with means to compensate for thermal expansion and contraction of the plunger assembly. In one embodiment of the invention, for example, the supporting bars are provided with an amount of flexure to allow for temperature expansion and contraction of the plunger assembly. In another embodiment this is accomplished in an arrangement employing supporting bars which provide at one end an open-end yoke coupling to the guide means and which also include means for establishing the desired spacing of the stator halves. The plunger core assembly is restricted to a reciprocal path guided by the bearing rods, thereby advantageously maintaining the proper alignment of the plunger core during operation.

Positioned about and spaced from the plunger core is a motor stator assembly having suitable windings which is mounted to the housing. The application of current to the stator windings causes a driving force on the plunger core which in turn drives the piston for compression of the working fluid. To obtain compressor operating stability, the piston may be ported to a gas spring means or balancing space to maintain centered operation of the piston stroke.

The flat motor configuration of this invention eliminates the need for an axial flux return path within the plunger core which allows for a great reduction of the plunger mass, allowing the plunger to be relatively lightweight and as such significantly reduces the amount of resonance spring required. The flat plunger is prevented from rotating due to the guide rods. Thus, by the present arrangement a new and improved motor is provided which allows for a rugged compact design which is both efficient and durable, yet relatively inexpensive.

BRIEF DESCRIPTION OF THE DRAWINGS

The foregoing objects and advantages and others will be realized by the present invention, the description of which should be taken in conjunction with the drawings wherein.

BEST MODE FOR CARRYING OUT THE INVENTION

With more particular regard to the drawings, there is shown a compressor 10. The compressor 10 includes an outer housing 12 which is cylindrical in shape, containing a flat plunger type electrodynamic motor 14 in accordance with this invention coupled to a compression piston assembly 16. A centering spring assembly 18 is provided at the opposite end of the plunger of the motor. In operation of the compressor, an alternating current is applied to the motor, causing its magnetic plunger to drive a compression piston in a first direction and compressing the working fluid (such as air, helium, etc.). The current then alternates so that the plunger oscillates and returns to its center position, because of the reversed driving force by the stator and/or the action of the centering spring assembly 18 and/or any incorporated gas spring means. The motor operates typically at the frequency of the local A-C power source (on the order of 60 Hertz in the U.S. and 50 Hertz in some foreign countries) continuously compressing the working fluid.

Turning now more particularly to the main elements of the device, the motor 14 is of the flat plunger type and comprises a stator 20 which may be formed in two sections 22A and 22B (FIG. 5) which are positioned above and below a magnetic plunger 24. The stator halves 22A and 22B include power coils 26 and field coils 27. Power coils 26 are adapted to be coupled to a source of alternating electric current and field coils 27 are adapted to be coupled to a source of direct current. The stator halves 22A and 22B are supported by end plates 30.

Four support members or arms 28 and 28A are suitably affixed, such as by bolts or the like, to a stator bar 31. The plunger assembly 24 is coupled to support bars 28 and 28A, by means of guide members or bearing shafts 66. The two support bars 28A are each provided with a thin beam section 29, which is created by a notch in the arms. These thin beam sections 29 provide a flexure to allow for expansion and contraction of the plunger assembly due to temperature variation. This flexure allows the guide members to move to absorb the differential of expansion. Since the thermal expansion across the plunger assembly can be, for example, five or more times the typical clearance between the guide members and the bearing sleeves 48, the need to adequately compensate for such thermal expansion is critical. The foregoing flexure system provides for a relatively simple but effective method of accomplishing the same.

Figure 6:
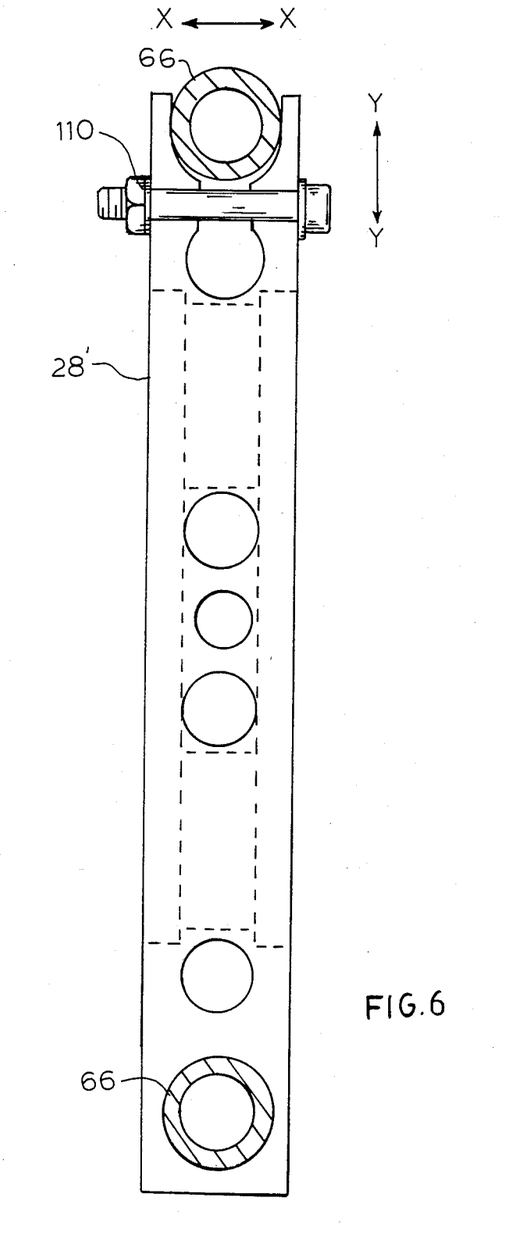
FIG. 6 is a front partial sectional view of an alternate support arm for the plunger incorporating the teachings of the present invention.
Figure 6A:
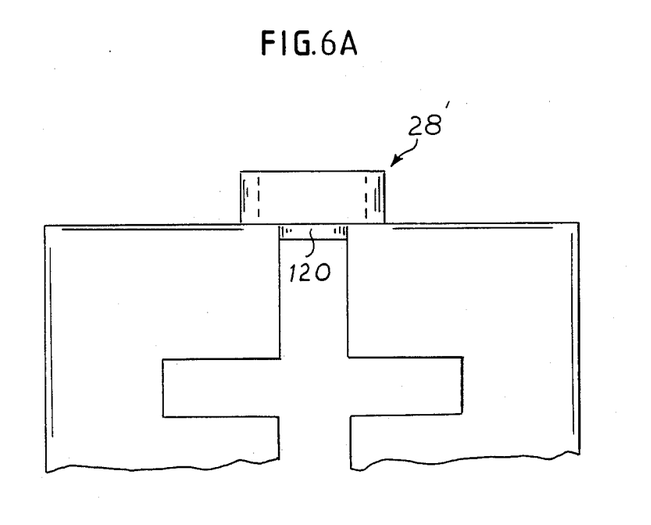
FIG. 6A is an end view of the support arm of FIG. 6 showing details of the means for spacing the stator halves.

An alternate means for accommodating the effect of thermal expansion, as well as providing for a means for spacing the stators, is shown in FIGS. 6 and 6A.

In FIG. 6 there is shown a support bar 28'. The plunger assembly 24 is coupled to support bars 28' in a manner similar to that described in connection with the support bars 28 and 28A. That is, one support bar 28' is provided at each end of the stator.

One end of support bars 28' is coupled as before to guide member 66. The other end of support bars 28' is provided with an open-end and is coupled in a yoke arrangement to its guide member 66. In the arrangement illustrated, a bolt 110 is provided which provides a convenient means for adjusting the clearance between the guide member 66 and the open-end yoke arrangement of support bars 28'. Alternatively, the slot of the open-end yoke may be machined in the support bars 28' with the required precision to achieve the desired close clearance.

As shown in FIG. 6A the support bars 28' are provided with a projection 120 which functions to establish the desired spacing between the two stator halves 22A and 22B. The support bars 28' also hold the two guide members 66 so that the centerline thereof is midway between the two stator halves 22A and 22B.

Figure 7:
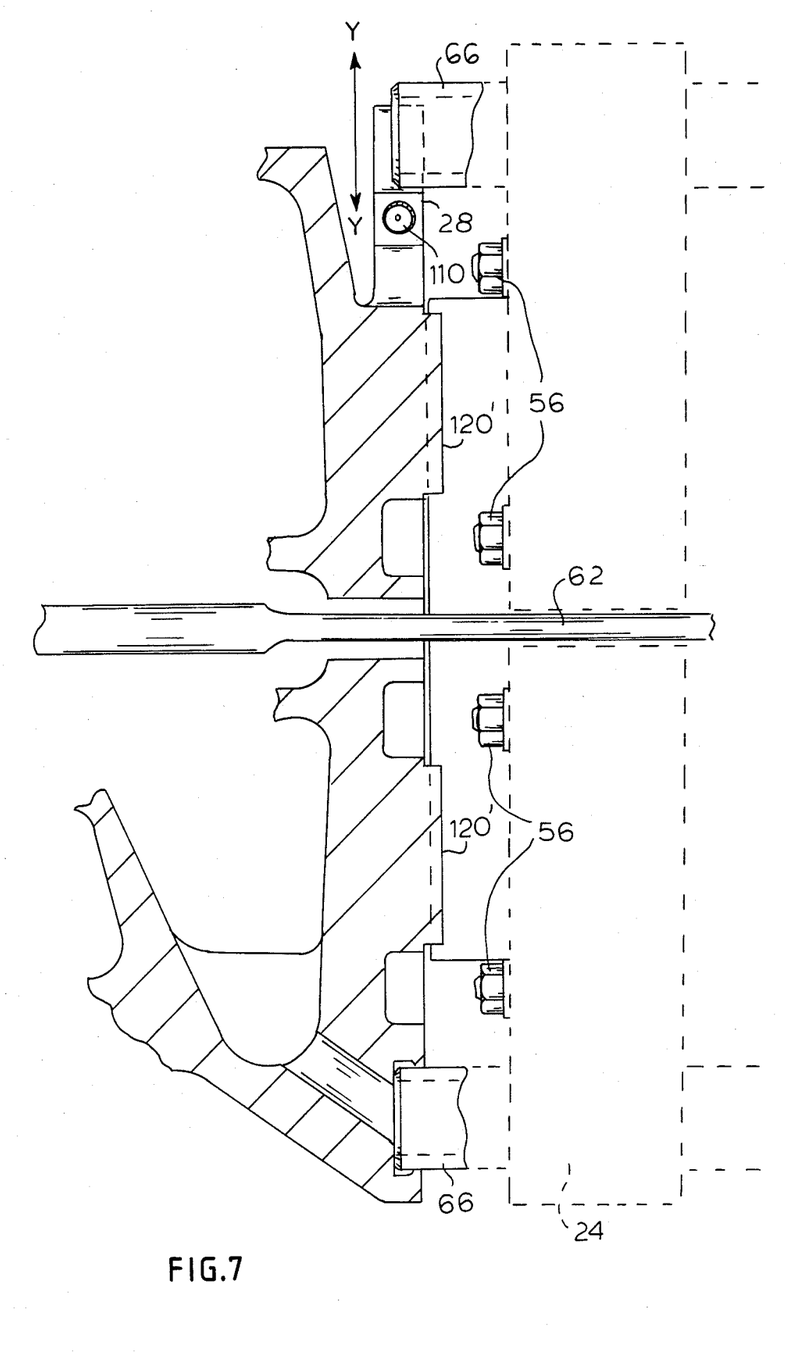
FIG. 7 is a partial sectional view of a compressor housing and plenum in accordance with another embodiment of this invention.

While shown and described in FIGS. 6 and 6A as being separate support bars 28', this same concept may be arranged as an integral part of the plenum casting as illustrated more clearly in FIG. 7. In such an arrangement, the projection 120' to establish the spacing of the stator halves 22A and 22B would be provided on the plenum casting. One of the the guide members 66 would also be held by the plenum casting such that it is fixed in one direction (X-X), but is free to move in the other direction (Y-Y) to accommodate thermal expansion of the plunger assembly. That is, both ends of one of the guide members 66 are free in the Y-Y direction, but are fixed in the X-X direction. The other guide member 66 may be fixed in both the X-X and the Y-Y directions at each end.

Figure 5:
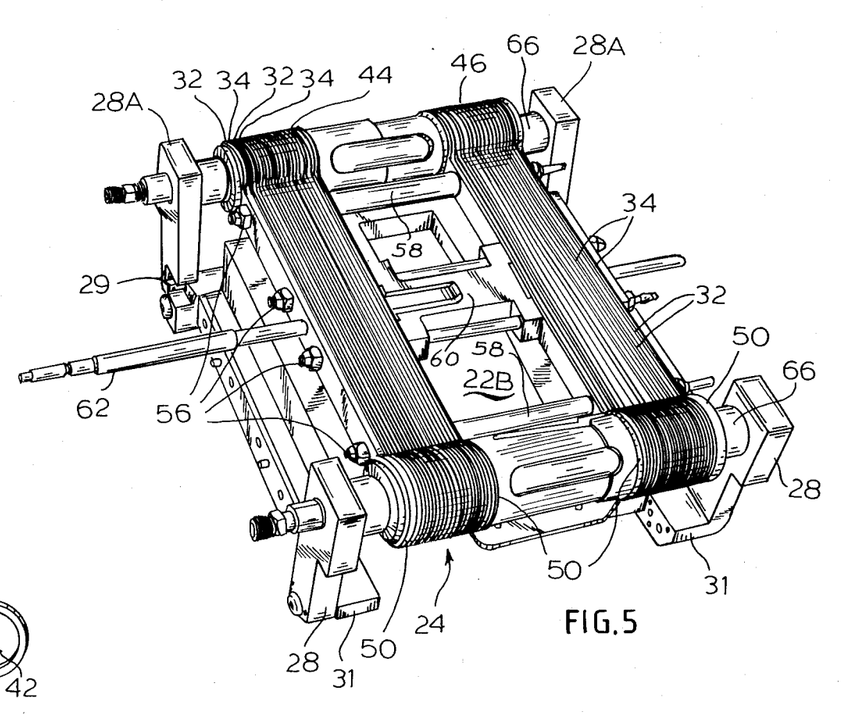
FIG. 5 is a perspective view of the plunger core assembly of the electrodynamic motor mounted on support arms and postioned over a portion of the stator.
Figure 5A:
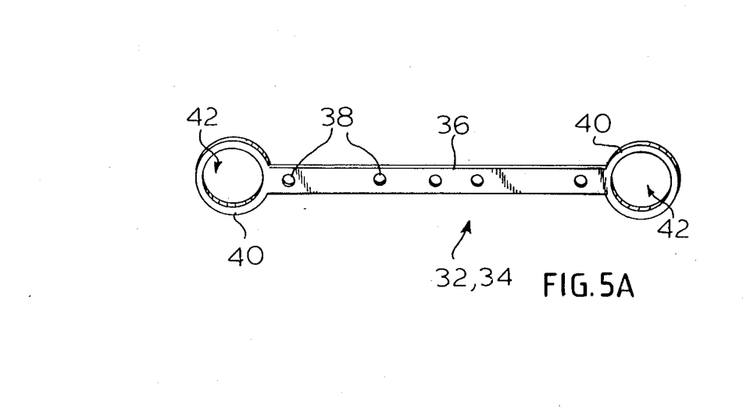
FIG. 5A is a perspective view of an individual member used in the plunger core assembly and incorporating the teachings of the present invention.
Figure 5B:
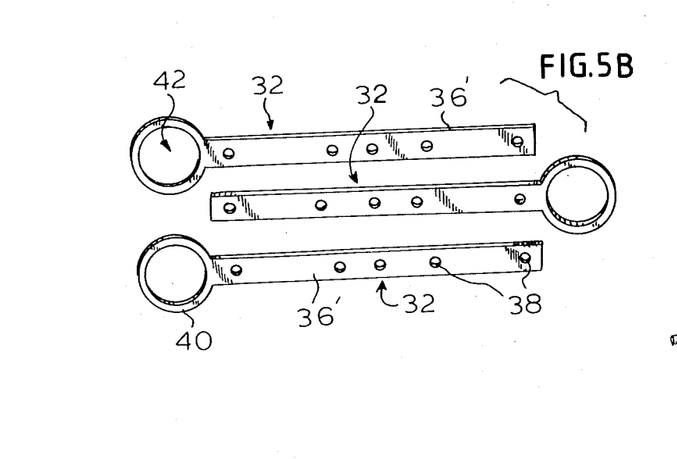
FIG. 5B is an exploded perspective view of an alternative configuration and arrangement of individual magnetic and insulating members.

Turning now more particularly to FIG. 5, the plunger assembly 24 comprises a plurality of thin magnetic members 32 which are positioned in a layered fashion alternating with insulating members 34 which may be of similar shape. The members 32 are made of low carbon steel or silicon steel. The insulating members 34 may be made of any suitable electrical insulating material, such as epoxy fiberglass, thermoplastic material, or the like. These members are shaped to include an elongated rectangular portion 36 having spaced openings 38 therein. At opposite ends of portion 36 of the member (FIG. 5A) are enlarged circular members 40 having respective openings 42 therein. While open circular ends of the magnetic and insulating members are shown positioned on each end of portion 36, alternate designs may include a circular opening on only one end and alternated from one member to the next as illustrated in FIG. 5B. The insulating members 34 may be of similar shape, and would be layered between magnetic members 32. (Insulating members 34 are illustrated in FIGS. 5A and 5B).

The magnetic and insulating members are positioned in a layered fashion, suitably clamped together such as by tie rods 56 and arranged into two spaced-apart groups or pole packs 44 and 46, which are maintained on hollow cylindrical bearing sleeves 48. The outer surface of the bearing sleeves 48 is provided with a suitable insulating material, such as a Mylar sleeve (shrunk), which serves to insulate the respective magnetic members 32 from the bearing sleeves 48. Through the use of the insulated, laminated members and insulated bearing sleeves, electrical currents cannot set up and circulate in the pole packs. Alternatively, any other electrically non-conductive coating can be used instead of a plastic material or sleeve. For instance, if the bearing sleeves 48 are made from a metallic material such as aluminum, anodization of the aluminum outer surface will provide a suitable non-conductive (insulating) coating.

The opposite ends of the bearing sleeves 48 have an outer diameter approximately equal to the internal diameter of the openings 42 of members 32 and 34 to allow sliding of the members thereon. The center portion 54 of the bearing sleeves 48 has an enlarged outer diameter so that the groups of pole packs 44 and 46 come into alignment therewith.

The plunger assembly 24 is clamped and maintained as a unit by way of tie rods 56 which pass through and terminate beyond groups 44 and 46 and are affixed with nuts. The outer tie rods are provided with spacers 58, which are positioned between the oppositely facing members 50. Appropriate material or coatings should be used for insulating purposes, since these tie rods should be electrically insulated from pole packs 44 and 46.

The inner tie rods 56 pass through a center spacer 60, also electrically insulated, positioned between pole packs 44 and 46. A central plunger rod 62 passes through the plunger assembly and is affixed at one end to the plunger assembly and at the other end to piston 64. The spring assembly 18 is attached to pole pack 46 of the plunger assembly 24 through a member 63 and the two inner tie rods 56. Rod 62 is affixed with respect to the spacer 60 which serves to anchor it such that the movement of the plunger assembly 24 in the direction of the piston 64 causes the rod 62 to in turn provide the dynamic force on the piston 64.

The bearing sleeves 48 are intended to be positioned about two parallel hollow cylindrical guide members or bearing shafts 66 which are rigidly mounted on the support arms 28 and 28A at each end. The guide members 66 axially guide the plunger assembly and allow it to oscillate smoothly therealong and serve to prevent rotation of the plunger assembly.

In such a plunger assembly, the flux passes axially through the stator and transversely through the pole packs. This eliminates the need for a centrally-located mass of metal to provide an axial flux return path in the plunger. The arrangement of the present invention, therefore, allows for greatly reducing the plunger mass. This lighter plunger assembly in turn advantageously eliminates the need for large resonance springs during operation.

In the arrangement illustrated, guide members 66 are shown as hollow and include means through which some of the working fluid may be channelled to provide hydrostatic bearings. To this end, the guide members 66 would be pressurized with compressor discharge fluid and provided with openings therethrough for the hydrostatic bearing effect. Any other suitable type of bearings may be used, depending upon the application, such as sleeve bearings, etc., which may readily be interchanged therewith.

Figure 1:
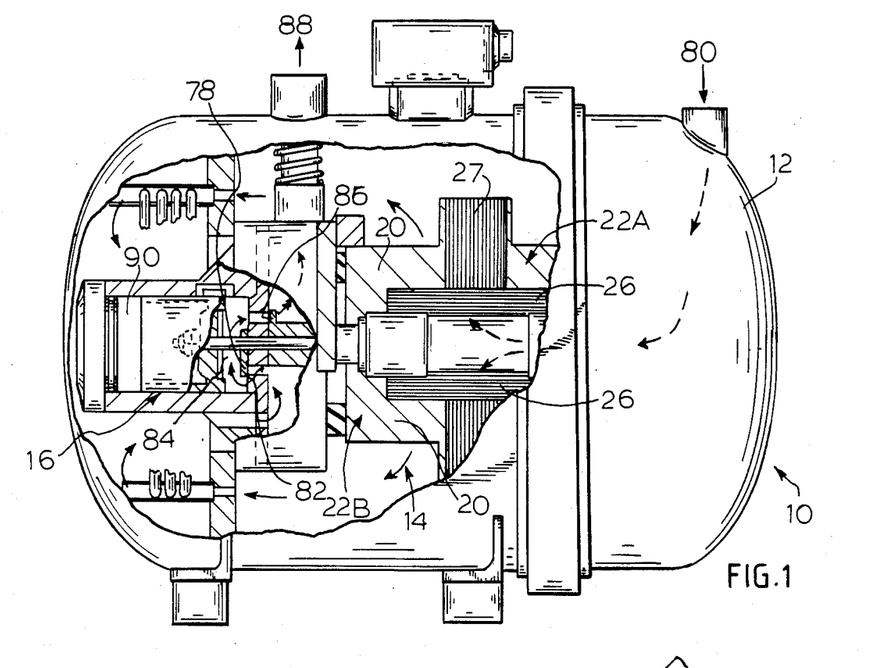
FIG. 1 is a partial sectional side view of the flat type electrodynamic motor in accordance with this invention illustrated in association with a single cylinder compressor.
Figure 2:
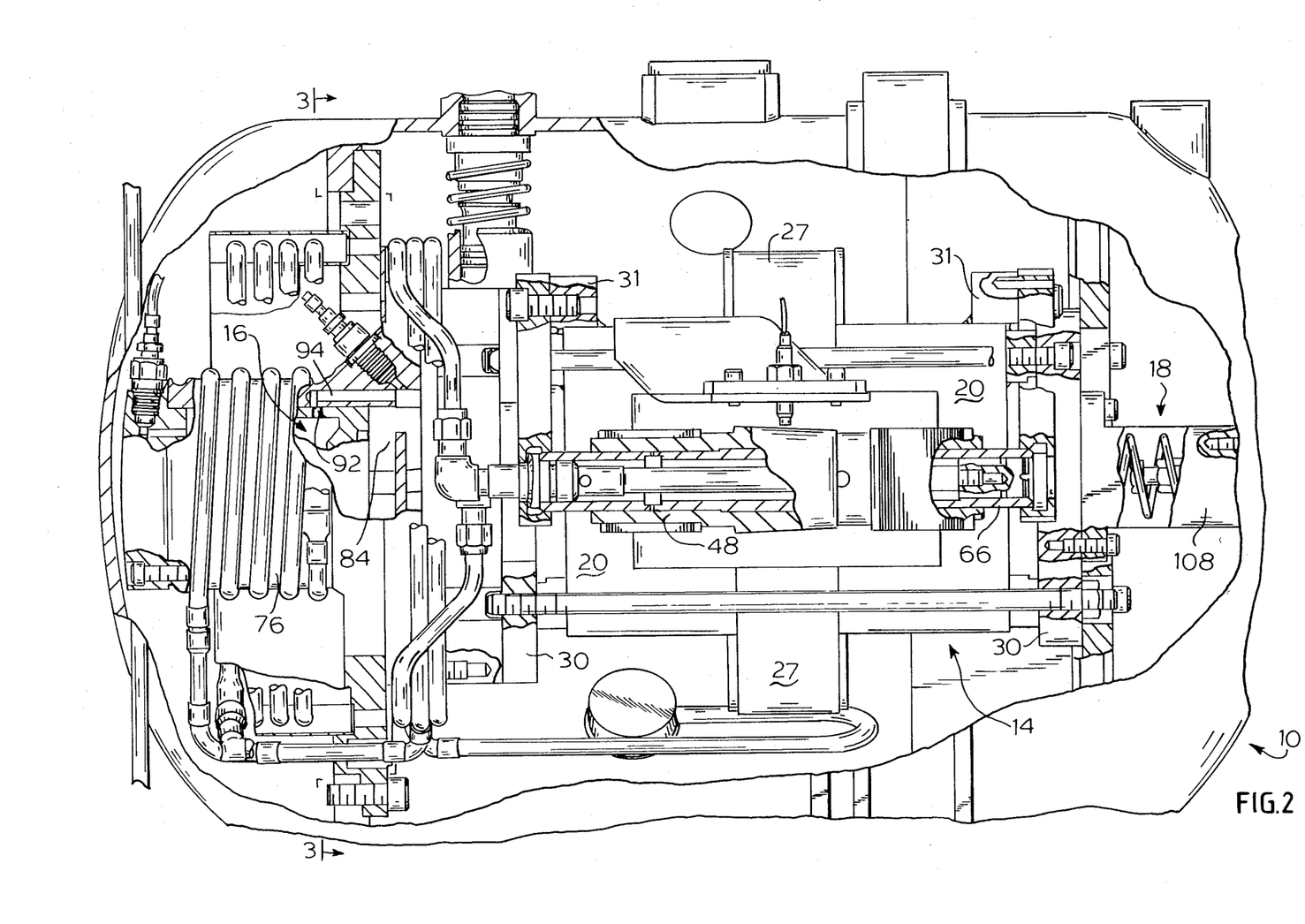
FIG. 2 is a detailed, partial sectional side view of the flat type electrodynamic motor in accordance with this invention illustrated in association with a single cylinder compressor.
Figure 3:
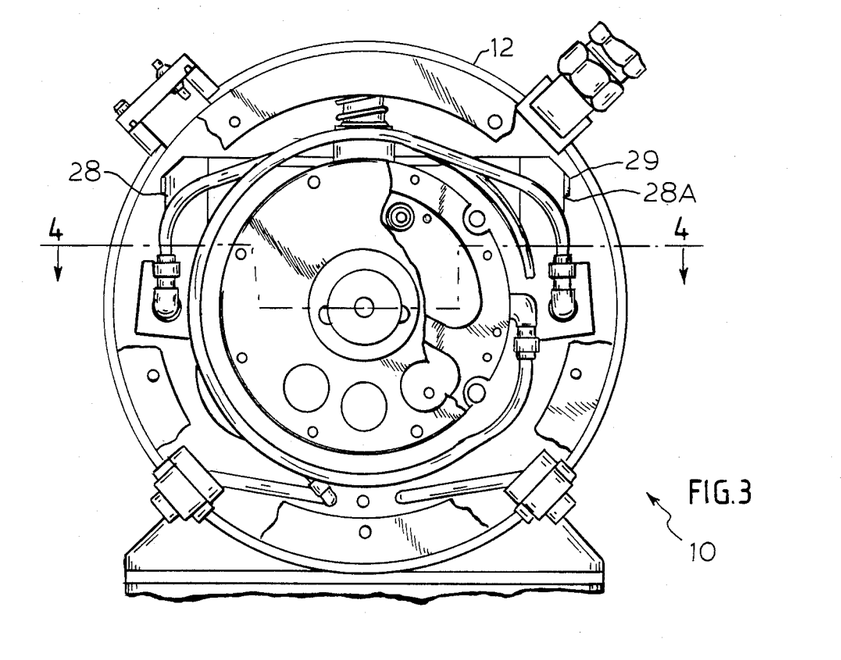
FIG. 3 is a front, partial sectional view taken along line 3—3 of FIG. 2.
Figure 4:
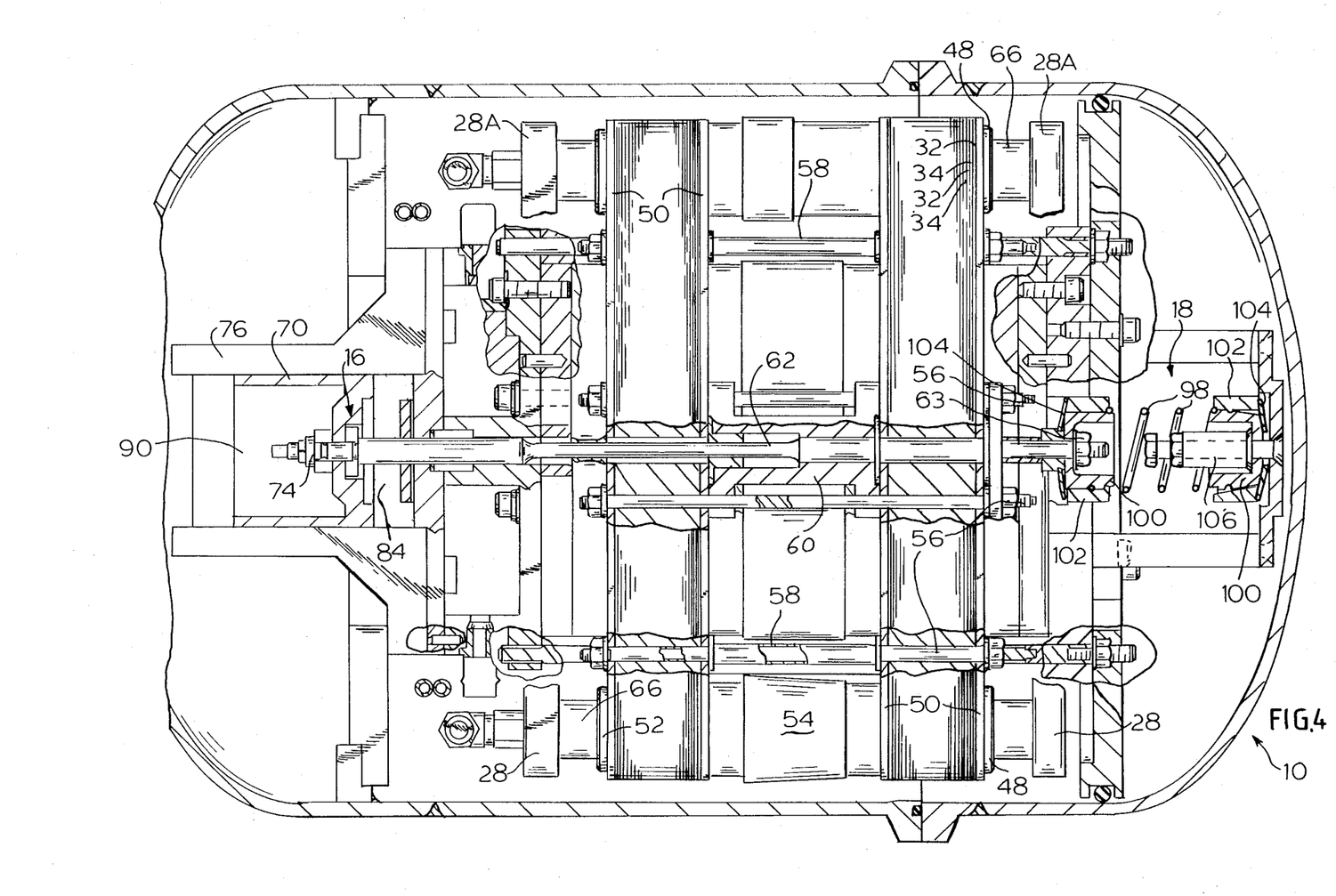
FIG. 4 is a detailed, partial sectional side view taken along line 4—4 of FIG. 3.

The compressor may be provided with a double-acting piston, which as shown more clearly in FIG. 4 may comprise a hollow cylindrical piston member 70 to be affixed at 74 to the piston rod 62. The piston is disposed within a cylinder 76.

The compressor is also provided with a suitable intake valve means 78 and discharge valve means 86. The valve means control the flow of working fluid from the housing through an intake opening 80, port 82, compression chamber 84 and outlet 88.

At one end of the piston member 70 is compression space 84 and on the opposite end is a balance chamber 90. Piston member 70 may be provided with a port 92 in its wall which can communicate with a channel 94 in the cylinder wall.

The compressor may also be provided with a spring assembly 18 which comprises a helical coil spring 98. Helical spring 98 is "threaded" onto a suitably machined mandrel block 100 which is provided with a clamping collar 102. The collar 102 may be suitably axially loaded, such as by a spring type or Belleville washer 104. The opposite end of the helical spring may be similarly affixed with the exception that the mandrel, collar and loading means are held in place by a suitable mounting bolt 106 axially centered with respect to the helical spring 98 by a suitable spring assembly housing 108.

Although only certain specific embodiments of the invention have been described in detail herein with reference where suitable to the accompanying drawing, it is to be understood that the invention is not limited to those specific embodiments and that various changes and modifications will occur to and be made by those skilled in the art. The appended claims, therefore, are intended to cover all such changes and modifications as fall within the true spirit and scope of the invention.

We claim:

1. A linear electrodynamic motor for reciprocating machines, comprising:
    a motor support means;
    guide means comprising at least two guide shafts maintained at a spaced distance with respect to each other;

plunger core means supported by said guide means for reciprocal movement within said support means and including at least two pole pack means and two bearing sleeve means positioned on opposite sides of the plunger core means;

said pole pack means comprising magnetic members and non-magnetic, electrically insulating members alternatively positioned with respect to each other, thereby forming laminations, said pole pack means having a generally flat configuration and being supported at opposite sides by said bearing sleeve means;

stator members supported above and below said pole pack means of the plunger core means;

said bearing sleeve means oriented such that their longitudinal axes are substantially transverse to the longitudinal axes of said guide means and slidably engaging said guide means during reciprocal movement of said plunger core means within said strator members;

wherein said laminations are substantially transverse to said guide means;

wherein the application of current to said motor causes a driving force on the plunger core means with the guide means preventing rotation of the plunger core means, and further comprising means to compensate for thermal expansion and contraction of said plunger core means, and wherein said means to accommodate thermal expansion includes means for supporting the guide means such that said guide means is fixed in one direction but is free to move in another direction.

2. The motor in accordance with claim 1, wherein said guide means is supported by a plurality of supporting bars some of which include a flexure zone to allow for said movement.

3. The motor in accordance with claim 1, wherein said bearing sleeve means comprise hollow cylindrical elongated members which slidably engage said guide means, and said magnetic and non-magnetic insulating members comprise elongated strips having on at least one end an enlarged portion having an opening therein which is positioned around and supported by the bearing sleeve means.

4. The motor in accordance with claim 3, wherein said magnetic and insulating members have enlarged portions with openings therein at both ends thereof which are respectively positioned around and supported by the respective bearing sleeve means.

5. The motor in accordance with claim 3, wherein said magnetic and insulating members have enlarged portions with openings therein at only one end and being arranged such that the open end of alternate members are positioned around and supported by the opposite respective bearing sleeve means.

6. The motor in accordance with claim 4, wherein said magnetic and insulating members are mechanically clamped together to form a rigid pole pack.

7. The motor in accordance with claim 6, wherein said magnetic and insulating members are clamped together by a plurality of tie bolt means.

8. The motor in accordance with claim 6, wherein said two pole packs are separated by spacers.

9. The motor in accordance with claim 8, wherein said guide means comprise elongated cylindrical members affixed at respective opposite ends to respective support means maintained by the support means.

10. The motor in accordance with claim 9, wherein at least one guide means is supported by a pair of support arms which include respectively a flexure zone so as to absorb expansion and contraction of the plunger core means as a result of temperature changes.

11. The motor in accordance with claim 9, wherein at least one guide means is in a yoke arrangement with a support means.

12. The motor in accordance with claim 1, wherein said guide means comprise hollow hydrostatic bearings.

13. The motor in accordance with claim 1, wherein at least one guide means is supported by a pair of support bars which include respectively a flexure zone so as to absorb expansion and contraction of the plunger core means as a result of temperature changes.

14. The motor in accordance with claim 1, wherein at least one guide means is in a yoke arrangement with a support means.

15. The motor in accordance with claim 1, which includes a central axially extending piston rod providing a means adapted to be coupled to compression piston means capable of compressing working fluid.

16. The motor in accordance with claim 1 wherein each of said magnetic members and each of said non-magnetic electrically insulating members comprise an elongated rectangular portion having first openings spaced thereon and a single enlarged circular member having a second opening thereon located at one end of said portion;

said magnetic members and said non-magnetic members being stacked and attached by connected means passing through said first openings of successive said magnetic and non-magnetic members so as to form said pole pack means;

said elongated portions being alternated so that said pole pack means includes two channels, one on each side of said pole pack means, each channel being formed of alternating second openings of said enlarged circular members, each channel being adapted to engage one of said bearing sleeves.

17. The motor in accordance with claim 1, wherein said means for supporting the guide means comprises means providing an open-end yoke coupling to a respective guide means and means for establishing a desired spacing between the stator members.

18. The motor in accordance with claim 1, wherein one of said guide means is fixed in the X-X direction but is free to move in the Y-Y direction.

19. The motor in accordance with claim 1, wherein said guide means is supported by a plurality of supporting bars one end of which is coupled in an open-end yoke arrangement to its respective guide means.

20. The motor in accordance with claim 19, wherein said supporting bars also include means for establishing a desired spacing between the stator members.

* * * * *